United States Patent [19]

Kosugi et al.

[11] Patent Number: 4,611,631
[45] Date of Patent: Sep. 16, 1986

[54] SOLENOID OPERATED POPPET TYPE CHANGE-OVER VALVE

[75] Inventors: Seiji Kosugi; Hideyuki Takata, both of Soka, Japan

[73] Assignee: Shoketsu Kinzoku Kogyo Kabushiki Kaisha, Tokyo, Japan

[21] Appl. No.: 694,305

[22] Filed: Jan. 24, 1985

[51] Int. Cl.$^4$ ............................................. F15B 13/044
[52] U.S. Cl. ........................ 137/625.65; 137/625.27; 251/129.19
[58] Field of Search ............ 137/625.27, 625.5, 625.65; 251/129, 129.19

[56] References Cited

U.S. PATENT DOCUMENTS

| | | | |
|---|---|---|---|
| 2,826,215 | 3/1958 | Wolfslau et al. | 251/129 X |
| 2,934,090 | 4/1960 | Kenann et al. | 137/625.5 |
| 3,016,920 | 1/1962 | Thomsen et al. | 137/625.65 |
| 3,538,954 | 11/1970 | Pagerlie et al. | 137/625.65 |
| 3,559,686 | 5/1968 | Hoffman. | |
| 3,707,992 | 1/1973 | Ellison et al. | 137/625.65 |
| 3,799,203 | 3/1974 | Doutt | 137/625.65 |
| 3,884,266 | 5/1975 | Kondo | 137/625.27 |
| 3,952,774 | 4/1976 | Loveless | 137/625.5 |
| 4,133,348 | 1/1979 | Spitz | 251/129 X |
| 4,529,006 | 7/1985 | Block et al. | 137/625.65 |

FOREIGN PATENT DOCUMENTS

| | | | |
|---|---|---|---|
| 2613664 | 10/1977 | Fed. Rep. of Germany | 251/129 |
| 1004134 | 9/1965 | United Kingdom | 137/625.5 |

*Primary Examiner*—Gerald A. Michalsky
*Attorney, Agent, or Firm*—Oblon, Fisher, Spivak, McClelland & Maier

[57] ABSTRACT

In a change-over valve, a valve member consists of a poppet type closure member. A pair of supporting rods are connected to the opposite end portions of the closure member. Guide members made of synthetic resin are connected to the opposite end portions of the supporting rods in order to guide the valve member upon changing over in the directions of fluid flow passages. The guide members prevent the closure member of the valve member from inclined and unstable seating against the valve seats.

10 Claims, 1 Drawing Figure

SOLENOID OPERATED POPPET TYPE CHANGE-OVER VALVE

BACKGROUND OF THE INVENTION

1. Field of the Invention

This invention relates to an improvement in and relating to a solenoid operated poppet type change-over valve.

2. Description of Prior Art

Various kinds of solenoid operated poppet type change-over valves ae known. For example, U.S. Pat. No. 3,559,686 discloses one type of such conventional valves. In the device disclosed therein, when a solenoid coil is energized to attract an armature toward a solenoid frame, a valve member is displaced so that one closure member of the valve member is brought into abutment against the valve seat and the other closure member is spaced from its valve seat, thus turning the valve into a change-over position of the fluid flow passages. On the other hand, when the solenoid coil is de-energized to extinguish the electromagnetic force between the armature and the frame, the valve member returns to its original state due to the function of the return spring. The armature is spaced from the frame, and the original state of the intercommunication of the fluid flow passages is restored.

In this connection, a seal member is mounted on the side of a valve casing in the device disclosed in the above-mentioned prior publication. However, it is apparent that the seal member may be mounted on the side of the confronting valve member instead.

The prior valve has a V-shaped seal member which is adapted for hermetically sealing the valve chamber and for securely guiding sliding movement of the supporting rods of the valve member. In order to attain good sliding of the valve member without tilting, a stiff and rigid material must be used as the seal member. However, soft material must be used as the seal member in order to eliminate resistance against its sliding movement. This constraint gives rise to an adverse effect in that the valve member is apt to move with a tilted posture. The tilting of the valve member can also be caused by frictional wear of the seal member when used over a long period of time.

If the valve member is displaced while tilted, the closure members will naturally be in contact with the valve seat in an inclined and unstable state. Accordingly, various drawbacks will be generated, such as uneven seating of the closure member against the valve seat, failure to obtain a hermetic seal due to uneven engagement of the closure member with the valve seat, and partial abrasive wear of both the valve member and the valve seat.

OBJECTS OF THE INVENTION

The present invention has been accomplished taking into consideration the foregoing drawbacks of the prior art. The principal object of the present invention is to provide a solenoid operated poppet type change-over valve which eliminates or reduces inclined engagement of the valve closure member with the valve seat with simplified construction which would otherwise unavoidably occur due to sliding movement of the valve member with a tilted posture.

It is another object of the present invention to attain the above-mentioned principal object with the suppressing resistance upon change-over the valve as low as possible, in conjunction with maintaining for a long period of time proper change-over function and preventing abrasive wear of sliding parts.

It is further object of the present invention to secure smooth and certain movement of the valve member with the least possible operation force by decreasing the sliding resistance to the movement of the seal member on the change-over of the valve member.

It is still another object of the present invention to maintain for a long period of time stable operation of the valve member without causing tilt of the valve member by exchanging parts or accessories thereof.

SUMMARY OF THE INVENTION

In order to attain the above-described principal object of the present invention, there is provided a solenoid operated poppet type change-over valve having a valve body defining a valve chamber and forming a plurality of fluid flow passages connected to the valve chamber. A valve member consisting of a poppet type closure member and a pair of supporting rods connected to the opposite sides of the closure member and adapted for changing over the flow direction of the fluid flow passages is located in the valve body. Cylindrical guide walls are formed in the valve body for slidably receiving respective supporting rods, seal member mounted between the outer periphery of the supporting rods and the inner periphery of the cylindrical guide walls for sealing the fluid flow passages, and a solenoid operation section for driving the valve member to displace between different change-over positions. A pair of guide members made of synthetic resin are connected to respective end portions of the supporting rods and are adapted for sliding engagement with the inner periphery of the cylindrical guide walls so as to guide the axial movement of the valve member. One of the guide members is brought into abutting engagement with a push rod which is driven by the solenoid operation section, and the other of the guide members is connected to a return spring.

By so constructing the valve, displacement of the supporting rods of the valve member can be properly guided by the guide members connected to the opposite sides of the valve member along the inner peripheries of the cylindrical guide walls so that the poppet type closure member can be prevented from inclined abutment with the valve seat. This ensures a hermetic seal of the valve seat and avoids partial wear of the closure member and the valve seat.

The above and other objects, features and advantages of the present invention will be apparent from the following description, taken in conjunction with the accompanying drawings which shows the presently preferred embodiment.

BRIEF DESCRIPTION OF THE DRAWING

The sole FIGURE shows a sectional view of the presently preferred embodiment of the present invention.

DESCRIPTION OF THE PRESENTLY PREFERRED EMBODIMENT

Figure 1:
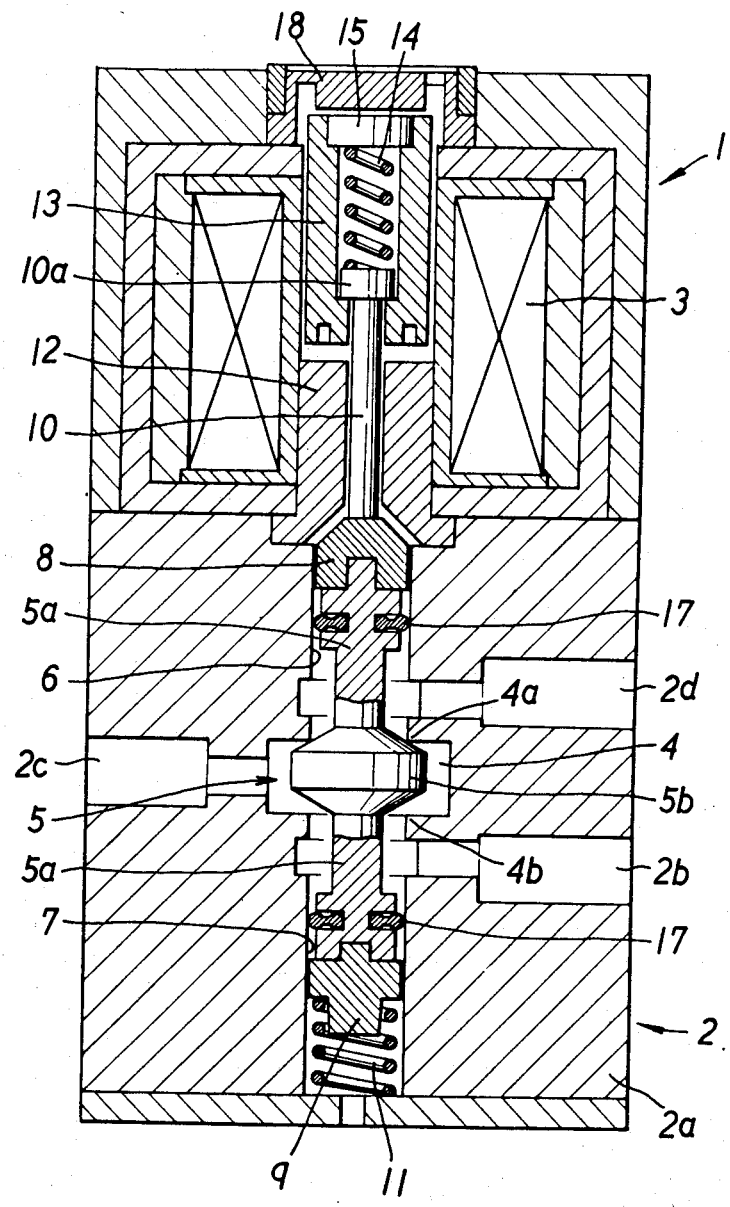

In the sole FIGURE, represented at 1 is a solenoid operation section, and at 2 is a valve section. Am electromagnetic coil 3 is provided in the solenoid operation section 1. A valve casing 2a in the valve section 2 contains a valve chamber 4 in which a valve member 5 is accommodated. The valve chamber 4 has two valve seats, 4a and 4b. The valve member 5 can be moved between a first change-over position (shown in the drawing) and a second change-over position lowered from the first change-over position by denergizing or energizing the electromagnetic coil 3 so that three fluid flow passages respectively having ports 2b, 2c, 2d formed in the valve casing 2a can selectively be switched.

The valve member 5 is composed of a poppet type closure member 5b and a pair of supporting rod 5a, 5a integrally connected to the opposite sides of the closure member 5b. Guide members 8, 9 are fixedly or detachably fitted onto respective end portions of the supporting rods 5a, 5a in order to facilitate displacement of the valve member 5 exactly in the axial direction. The guide members 8, 9, are slidably inserted into cyclindrical guide walls 6, 7 formed in the valve casing 2a. The connection of the guide members 8, 9 to the supporting members 5a, 5a may be accomplished, for example, in an inlaid manner. That is, a convex or a concave surface is formed on the end portion of the supporting rod 5a of the valve member 5 and corresponding concave or convex surface is formed on the part of the facing inner periphery of the guide member 8, 9. The thus formed convex and concave surfaces are coupled with each other fixedly or detachably. The guide member 8 is abutted against a push rod 10 which is driven by the solenoid operation section 1, while guide member 9 works as a spring seat for a return spring 11.

The guide members 8, 9 may be made of a synthetic resin which is relatively abrasion-proof, has low sliding resistance, and has high anti-compression properties. By using the just-mentioned material to form the guide members 8, 9, the guide member 8, 9 can guide the valve member 5 smoothly without increasing resistance against the sliding movement so that the valve member 5 exhibits proper change-over function over a very long period of time. Specifically, the synthetic resin which is used to form the guide members 8, 9 is preferably selected from the group consisting of polyimide, polytetrafluoroethylene, polybutadieneterephthalate, and polyacetal. If desired, the resin can be reinforced by a reinforcing agent such as glass fiber.

In addition, the guide members 8, 9 are adapted for guiding the supporting rods 5a, 5a of the valve member 5 in a sliding movement along the inner periphery of the cylindrical guide walls 6, 7 of the valve casing 2a by forming them so that the guide member 8 is abutted against the push rod 10. By this technique, frictional wear can be markedly reduced for the sliding portion of the supporting rod 5a and the push rod 10 which would occur if they directly contacted each other. Also, the guide member 9 sustains the end portion of the supporting rod 5a without direct contact with the return spring 11.

In the case where the guide members 8, 9 are detachably fitted onto the supporting rods 5a, 5a, a fresh guide member may be easily exchanged for one which has been worn by friction, thereby ensuring the smooth and proper displacement of the valve member 5 over very long period of time by appropriately exchanging the guide members 8, 9. In this connection, the guide members 8, 9 do not necessarily have a column like contour to intimately fit over the whole periphery into the cylindrical guide walls 6, 7. Instead, they may be provided with several axial ridges which are adapted for sliding engagement with the inner periphery of the cylindrical guide walls 6, 7. Thus additional reduction of resistance against the sliding movement by decreasing the sliding area may be obtained.

Resilient seal members 17, 17 are mounted around the outer peripheries of the supporting rods 5a, 5a for hermetically sealing the working fluid. The seal members 17, 17 have the additional function of sparing the guide members 8, 9 direct contact with working fluid. Therefore, irrespective of the chemical property of the working fluid, and even if fine particles such as dirt are carried by the working fluid, the guide members 8, 9 are protected therefrom. Accordingly, the most suitable material for the guide members 8, 9 can be selected from various materials without consideration of the influence of the working fluid. The illustrated seal members 17, 17 have a cross sections such that the length in the radial direction is longer than the axial direction, thereby reducing resistance on sliding movement.

The push rod 10 is driven by the electromagnetic coil 3. It detachably inserted into a recess formed in an armature 13. The armature 13 is attracted to a fixed core 12 upon energization of the electromagnetic coil 3. Provided at the upper end of the push rod 10 is a flanged portion 10a to prevent it from slipping out of the armature 13. A spring 14 is compressedly interposed between the flanged portion 10a and a stopper member 15 for urging the push rod 10 toward the projecting direction. Thereby, the difference of strokes between the armature 13 and the valve member 5 can be absorbed by movement of the push rod 10 relative to the armature 13. Sufficient force to close the valve member 5 against the valve seat 4b is available at the second change-over position due to the biasing force of the spring 14.

Further, reference numeral 18 represents a push button made of a flexible material. The push section 18 may be used for manually displacing the valve member 5 when it is locked for some reasons.

In the de-energized state of the electromagnetic coil 3 of the above-described solenoid valve, the valve member 5 is located at the first change-over position (shown in the drawing). In this state, the poppet type closure member 5b closes the valve seat 4a due to the force of the return spring 11. The biasing force of the return spring 11 is transmitted to the armature 13 through the push rod 10 and the spring 14. Accordingly, the aramture 13 is kept apart from the fixed core 12.

Then, upon energizing the electromagnetic coil 3, the armature 13 is attracted to the fixed core 12. The spring 14 is compressed, urging the push rod 10 the guide member 8, the valve member 5, and the guide member 9 in the direction to compress the return spring 11. Movement of the valve member 5 to the second change-over position seats the closure member 5b upon the valve seat 4b.

The valve member 5 is displaced in the axial direction bg energizing or de-energizing the electromagnetic coil 3. Displacement of the valve member 5 is guided without tilting by the guide members 8, 9 connected to respective supporting rods 5a, 5a. Therefore, the closure member 5b is certainly prevented from inclined and uneven seating upon the valve seats 4a, 4b. Accordingly, hermetic sealing is available between the closure member 5b and respective valve seats 4a, 4b. In this connection, it is a matter of course that the partial abrasive wear can certainly be prevented for both the supporting rods 5a, 5a and cylindrical guide walls 6, 7 because of avoiding the direct contact therebetween.

Moreover, since the guide members 8, 9 are made of the synthetic resin having the foregoing properties, smooth sliding movement of the valve member 5 on change-over operations can be attained with minimal resistance against the sliding movement. Accordingly, abrasion of both the guide members 8, 9 and the cylindrical guide walls 6, 7 can be minimized.

The seal members 17, 17 do not appreciably affect the sliding movement of the valve member 5. The valve member 5 is guided substantially solely by the guide members 8, 9. Accordingly, the seal members 17, 17 may have a cross section as shown in the drawing. Such a cross-section is easily deformable upon depression from outside, thereby reducing resistance against the sliding movement of the valve member 5. This in turn permits to change-over of the valve with a very small driving force.

What is claimed for patent is:

1. A solenoid operated poppet type change-over valve comprising:
   (a) a valve body having:
      (i) a valve chamber therein;
      (ii) two oppositely directed cylindrical bores in fluid communication with said valve chamber, the interface between each of said oppositely directed cylindrical bores and said valve chamber defining oppositely directed, spaced valve seats; and
      (iii) at least one fluid flow passage in fluid communication with one of said valve chamber and said two oppositely directed cylindrical bores;
   (b) a valve member comprising:
      (i) a poppet type closure member disposed in said valve chamber and movable between a first position in which it valves one of said valve seats and a second position which it valves the other one of said vale seats and
      (ii) two oppositely directed supporting rods, one of said two oppositely directed supporting rods extending from said closure member into one of said two oppositely directed cylindrical bores and the other one of said two oppositely directed supporting rods extending from said closure member into the other one of said two oppositely directed cylindrical bores, said supporting rods being sized, shaped, and positioned so that they do not contact the walls of said oppositely directed cylindrical bores;
   (c) means for biasing said poppet type closure member into its first position;
   (d) a solenoid operation section for driving said poppet type closure member into its second position against the force of said means;
   (e) two resilient seal members, one of said two resilient seal members being mounted on each of said two oppositely directed supporting rods outboard of said at least one fluid flow passage, said seal members comprising means for preventing flow of working fluid outboard of said seal members; and
   (f) two guide members made of synthetic resin, one of said two guide members being mounted on each of said two oppositely directed supporting rods outboard of an associated one of said two resilient seal members, each one of said two guide members being sized, shaped, and positioned to make sliding engagement with an associated one of said two oppositely directed cylindrical bores.

2. A valve as recited in claim 1 wherein said solenoid operation section drives a push rod that bears against but is not attached to one of said two guide members.

3. A valve as recited in claim 2 wherein said push rod is spring biased away from the associated one of said two guide members.

4. A valve as recited in claim 1 wherein said means is a spring that bears against one of said two guide members.

5. A valve as recited in claim 1 wherein each one of said two resilient seal members has a radial cross section that is greater than its axial cross section.

6. A valve as recited in claim 1 wherein each one of said two oppositely directed cylindrical bores has the same cross sectional diameter.

7. A valve as recited in claim 1 wherein:
   (a) one fluid flow passage is in fluid communication with said valve chamber and
   (b) one fluid flow passage is in fluid communication with each one of said two oppositely directed cylindrical bores between said valve chamber as the associated one of said resilient seal members.

8. A valve as recited in claim 1 wherein each one of said guide members is detachably mounted on an associated one of said supporting rods.

9. A valve as recited in claim 1 wherein the synthetic resin of which each one of said two guide members is made is selected from the group consisting of polyimide, polybutadieneterphthalate, polyacetal, and polytetrafluoroethylene.

10. A valve as recited in claim 9 wherein the synthetic resin is reinforced with glass fibers.

* * * * *